(12) United States Patent
Elhanany

(10) Patent No.: US 7,758,095 B2
(45) Date of Patent: Jul. 20, 2010

(54) METHOD AND SUSPENSION APPARATUS FOR SUSPENDING AN OBJECT IN A VEHICLE

(75) Inventor: Zohar Elhanany, Galil Elyon (IL)

(73) Assignee: Plasan Sasa Ltd., Marom Haglil (IL)

( * ) Notice: Subject to any disclaimer, the term of this patent is extended or adjusted under 35 U.S.C. 154(b) by 0 days.

(21) Appl. No.: 12/073,932

(22) Filed: Mar. 12, 2008

(65) Prior Publication Data

US 2008/0231068 A1 Sep. 25, 2008

(30) Foreign Application Priority Data

Mar. 21, 2007 (IL) .................................. 182081

(51) Int. Cl.
*B60N 2/00* (2006.01)
(52) U.S. Cl. ...................................... 296/63
(58) Field of Classification Search .............. 296/63, 296/64; 244/122 R; 297/216.1; 248/503.1; 280/124.138, 124.106, 124.116
See application file for complete search history.

(56) References Cited

U.S. PATENT DOCUMENTS

| | | | |
|---|---|---|---|
| 2,276,080 A | | 3/1942 | McCaslin |
| 2,442,375 A | * | 6/1948 | Paxton .................... 244/122 R |
| 2,538,427 A | | 1/1951 | Rogers et al. |
| 2,556,076 A | * | 6/1951 | Evans et al. ...................... 5/9.1 |
| 2,556,077 A | * | 6/1951 | Fetterly et al. ................... 5/9.1 |
| 2,685,912 A | * | 8/1954 | Evans et al. .............. 248/240.2 |
| 2,700,412 A | * | 1/1955 | Evans et al. ................. 297/232 |
| 2,829,702 A | | 4/1958 | Keating |
| 2,853,258 A | * | 9/1958 | Polleys ................. 244/122 AH |
| 3,314,720 A | * | 4/1967 | Millington et al. ....... 297/216.1 |

(Continued)

FOREIGN PATENT DOCUMENTS

WO 2005/028245 A1 3/2005

*Primary Examiner*—Kiran B. Patel
(74) *Attorney, Agent, or Firm*—The Nath Law Group; Susanne M. Hopkins; Jiaxiao Zhang

(57) ABSTRACT

A method and suspension apparatus for suspending an object in a vehicle. The vehicle having inner surfaces including a lower surface and an upper surface, comprising an object and a suspension apparatus adapted for holding the object in a suspended position in the vehicle. The suspension apparatus comprising an elongated suspension element, an anchoring arrangement for spacing the object from, and arresting its motion towards, the lower and upper surfaces of the vehicle in the suspended position, and a tensioning mechanism adapted to tension the elongated suspension element. The elongated suspension element comprising a first end portion, a second end portion and a central portion extending therebetween. The anchoring arrangement comprising a plurality of connection elements including static and dynamic connection elements which are fixed to the lower and upper surfaces of the vehicle and the object, and which engage the suspension element, thereby holding it in a predetermined spatial disposition with the possibility to be tensioned by said tensioning mechanism. The engagement of the suspension element with the connection elements is in the form of static connection of each of the end portions with the static connection elements, and dynamic connection of the central portion with the dynamic connection elements, which are disposed on the object and/or at least two spaced apart points on the upper surface, whereby the central portion of the suspension element is allowed to move relative to the dynamic connection elements when the suspension element is not under tension.

24 Claims, 6 Drawing Sheets

U.S. PATENT DOCUMENTS

| | | | |
|---|---|---|---|
| 3,620,568 A * | 11/1971 | Morrow | 297/307 |
| 3,868,143 A * | 2/1975 | Reilly | 297/216.17 |
| 3,944,201 A * | 3/1976 | Tantlinger | 296/63 |
| 3,986,748 A * | 10/1976 | Magnuson | 296/65.02 |
| 4,005,765 A | 2/1977 | Reilly | |
| 4,474,347 A | 10/1984 | Hazelsky | |
| 6,378,939 B1 * | 4/2002 | Knoll et al. | 297/216.1 |
| 6,409,243 B1 * | 6/2002 | Hansen | 296/68.1 |
| 6,428,254 B2 * | 8/2002 | Craft | 410/7 |
| 7,594,701 B2 * | 9/2009 | Kawabata et al. | 297/452.63 |
| 7,651,134 B2 * | 1/2010 | Rosso | 280/801.1 |

* cited by examiner

METHOD AND SUSPENSION APPARATUS FOR SUSPENDING AN OBJECT IN A VEHICLE

FIELD OF THE INVENTION

This invention relates to a method and suspension apparatus for suspending an object in a vehicle, and more particularly to suspension arrangements comprising non-rigid elements to suspend the object.

BACKGROUND OF THE INVENTION

It is known that when a vehicle is subjected to sudden external forces such as those caused if the vehicle crashes into another object or the vehicle is impacted by a shock wave of an explosion, damage to objects and injury to occupants within the vehicle will likely occur.

As vehicle designers often aim to provide maximum protection to occupants of a vehicle, many types of vehicle safety seats are known, which are secured to inner surfaces of the vehicle, particularly the lower and upper surfaces thereof.

It should be noted that for the purposes of the specification and the claims that the term "vehicle" is intended to include all types of means of transportation such as land, sea and air vehicles and the terms "lower surface" and "upper surface" may respectively refer not only to a floor and ceiling of a vehicle but also to a portion of a side wall adjacent to the floor or ceiling thereof.

U.S. Pat. No. 3,314,720 discloses an aircraft safety seat comprising a pair of supporting straps secured at their upper ends via an anchoring arrangement to the side wall of an aircraft. The seat further comprises a seat pan pivotally secured to the side wall of the aircraft by a connection element in the form of a hinge and to a lower surface of the aircraft via a non-resilient shock absorbing strut thereby rigidly securing the seat pan under normal loads but yielding when the load exceeds a predetermined amount.

U.S. Pat. No. 2,538,427 discloses an aircraft seat having a seat mounting arrangement by means of which a seat may be mounted upon a chair supporting frame which permits lateral and vertical movement thereof with respect to the aircraft. The frame has tubes which are attached to the upright bulkhead channels of the aircraft.

One known method of minimizing damage to objects within a vehicle, subjected to sudden external forces, is to space the object from the inner surfaces of the vehicle, so as to prevent impact of the surfaces of the vehicle to the object. An object may be spaced from the inner surfaces of a vehicle by the use of an anchoring arrangement including a plurality of connection elements fixed to the inner surfaces and the object and flexible elongated elements connecting the object to be spaced to the connection elements, thereby anchoring it to the vehicle.

U.S. Pat. No. 4,474,347 discloses a safety seat comprising a seat member, an anchoring arrangement having fixed connection points on the upper and lower surfaces of the vehicle, suspending means held by the anchoring arrangement in a predetermined spatial disposition between the upper surface of the vehicle and the seat member, rotary energy absorbing means mounted between the suspending means and the upper surface, and first and second pairs of energy absorbing means mounted between the seat member and the lower surface of the vehicle and capable of absorbing energy in both tension and compression.

U.S. Pat. No. 3,868,143 discloses a safety seat for a vehicle comprising a beam pivotally supported by a vehicle structure, an anchoring arrangement having connection elements fixed to the upper and lower surfaces of the vehicle and the seat, a pair of rigid struts having one ends thereof pivotally attached to the vehicle floor beneath the beam, a rigid member connecting the other ends of the struts, a pair of flexible suspenders connected between the beam and the rigid member, a flexible sling for seating an occupant connected to the suspenders via a webbing, straps connected between the rigid member and a lower surface of the vehicle and a lap belt for the sling.

Certain suspension arrangements suspend objects in a vehicle in a position spaced from the inner surfaces of the vehicle and other objects, via the use of non-rigid elements only, which connect connection elements of an anchoring arrangement and the object, thereby preventing transfer of forces impacting the vehicles surfaces to the object via any rigid elements. Such non-rigid elements may be flexible elongated suspension elements, such as ropes and belts, held by an anchoring arrangement in a predetermined spatial disposition to suspend the object in a position spaced from at least some of the surfaces likely to be impacted by sudden forces.

WO 2005/028245 discloses a safety seat for vehicles consisting of a harness suspended from fixed points of the vehicle. Fabric retaining belts lead from the harness to belt retractors that are located at fixed points of the vehicle and that pre-tension the belts. The seat is equipped with a selector mechanism for enabling the belt retractors to adopt a free-running state to adjust or tension the belts or a locked state.

U.S. Pat. No. 2,829,702 discloses a safety seat for vehicles wherein the body of an occupant is supported within a resilient net which is secured to resilient supporting straps connected to the interior of the vehicle. The safety seat comprises a plurality of spaced flexible riser straps and an anchoring arrangement for holding the straps via connection elements which connect the ends of each of the straps to a supporting structure. The safety seat further comprising a resilient body supporting net having lateral edge portions secured along its length to one of the riser straps.

U.S. Pat. No. 2,276,080 discloses a safety seat for vehicles comprising a seat constructed as a closed textile cover, which is fixable above and below, by means of fastening belts fitted thereto, between fixed points on the floor and the roof of the vehicle.

SUMMARY OF THE INVENTION

In accordance with one aspect of the present invention there is provided a vehicle having inner surfaces including a lower surface and an upper surface, comprising an object and a suspension apparatus adapted for holding the object in a suspended position in the vehicle; the apparatus comprising an elongated suspension element, an anchoring arrangement for spacing the object from, and arresting its motion towards, the lower and upper surfaces of the vehicle in the suspended position, and a tensioning mechanism adapted to tension the elongated suspension element; the elongated suspension element comprising a first end portion, a second end portion and a central portion extending therebetween; the anchoring arrangement comprising a plurality of connection elements including static and dynamic connection elements which are fixed to the lower and upper surfaces of the vehicle and the object, and which engage the suspension element, thereby holding it in a predetermined spatial disposition with the possibility to be tensioned by said tensioning mechanism; the engagement of the suspension element with the connection elements being in the form of static connection of each of the end portions with the static connection elements, and dynamic connection of the central portion with the dynamic connection elements, which are disposed on the object and/or at least two spaced apart points on the upper surface, whereby the central portion of the suspension element is allowed to move relative to the dynamic connection elements when the suspension element is not under tension.

Both static connection elements engaging the end portions of the suspension element may be fixed to the inner surfaces of the vehicle or to the object, or one may be fixed to one inner surface of the vehicle and the other to the object. The plurality of connection elements may include two connection elements fixed to two spaced points on the lower surface of the vehicle.

The apparatus may comprise at least one additional elongated suspension element.

Each suspension element may be made of bendable and inelastic material, for example it may be a high strength fiber rope or a high strength cable or a high strength cord or a high strength strap/belt.

The spacing of the object from, and arresting its motion towards, the upper surface of the vehicle may be achieved by engagement of connection elements fixed on the lower surface of the vehicle and the object, with one or more suspension elements.

The tensioning mechanism may be mounted on the suspension element. It may be a ratchet mechanism or any other suitable mechanism for tensioning the suspension element. There may be more than one tensioning mechanism.

The suspension apparatus may further comprise stabilizing elements for arresting rotational motion and/or shaking of the object.

The object to be held by the suspension apparatus in a suspended position may be a seat, a piece of equipment, a seat-supporting frame, a seat assembly comprising a seat-supporting frame and seat for mounting thereon, or the like. The apparatus may be adapted for holding two objects which may be spaced apart. The suspended position of any object suspended by the apparatus may be spaced from all inner surfaces of the vehicle and any other objects in the vehicle. In a case where the object is a seat, it may be ensured that a person sitting thereon would be spaced from all the inner surfaces of the vehicle and surrounding objects.

Seats of the type mentioned may be detachably attached to the suspension element and may comprise, for example, any of the following: a foot rest for spacing a person sitting thereon from the lower surface of the vehicle, a rigid base and a rigid back extending from the base. In the case where the object is a seat assembly it may include a seat-supporting frame adapted for mounting on the suspension element via said connection elements of the anchoring arrangement and slidable engagement therewith, and a seat adapted to be mounted on the seat-supporting frame. The connection elements used to mount the seat-supporting frame on the suspension element may further comprise a clamping mechanism for clamping the suspension element and thereby changing said slidable engagement to a static engagement. The seat and the seat-supporting frame may further comprise a corresponding rail arrangement which allows slidable engagement thereof.

The suspended position of the object with respect to the inner surfaces of a vehicle may be adjusted. For example, in a case where the object is a seat comprising a back portion which engages a suspension element via the above-described connection element(s) having a clamping mechanism, the position of the seat may be adjusted towards the upper or lower surfaces of the vehicle before the clamping mechanism is engaged.

According to a further aspect of the present invention there is provided a suspension apparatus for use in a vehicle, having any of the features described above.

In accordance with another aspect of the present invention there is provided a vehicle comprising a suspension apparatus having any of the features described above and a platform spaced in a bridge-like manner a predetermined height from the vehicle's floor, by attachment to one or more side walls of the vehicle. In a case where the suspension apparatus suspends a seat, the platform may spaced from a lower portion of the seat to allow the feet of a person sitting on the seat to rest on the platform. One of the advantages of such platform is an increased efficiency in the use of vehicle space. This is accomplished by removing the need for seats within the vehicle to each have a protruding foot rest, using valuable vehicle space, while still allowing a seated their to comfortably rest user feet on an object, i.e. foot rest platform, without subjecting themselves to the types of dangers caused by sudden external forces as described above.

Yet another aspect of the present invention provides a method for holding at least one object in a suspended position in a vehicle having fixed inner surfaces including a lower surface and an upper surface, including the steps of:

(a) providing a suspension apparatus including a suspension element comprising two end portions and a central portion extending therebetween, a single tensioning mechanism mounted on the suspension element, and an anchoring arrangement comprising a plurality of connection elements including static and dynamic connection elements;

(b) fixing the connection elements to two connection points on the vehicle's upper surface and at least one point on the object and the lower surface of the vehicle;

(c) engaging the static and dynamic connection elements with the suspension element, thereby holding it in a predetermined spatial disposition with the possibility to be tensioned by said tensioning mechanism; the engagement of the suspension element with the connection elements being in the form of static connection of each of the end portions with the static connection elements, and dynamic connection of the central portion with the dynamic connection elements, which are disposed on the object and/or at least two spaced apart points on the upper surface, whereby the central portion of the suspension element is allowed to move relative to the dynamic connection elements when the suspension element is not under tension; and (d) tensioning the suspension element via the tensioning mechanism such that the object is thereby spaced and arrested from motion towards the lower and upper surfaces of the vehicle in the suspended position.

Among different advantages of the above described engagement of the suspension element with the anchoring arrangement's connection elements, is that the apparatus only requires a single tensioning mechanism to bring an object to a suspended position.

BRIEF DESCRIPTION OF THE DRAWINGS

In order to understand the invention and to see how it may be carried out in practice, embodiments will now be described, by way of non-limiting examples only, with reference to the accompanying drawings, in which.

DETAILED DESCRIPTION OF EXEMPLARY EMBODIMENTS

Figure 1:
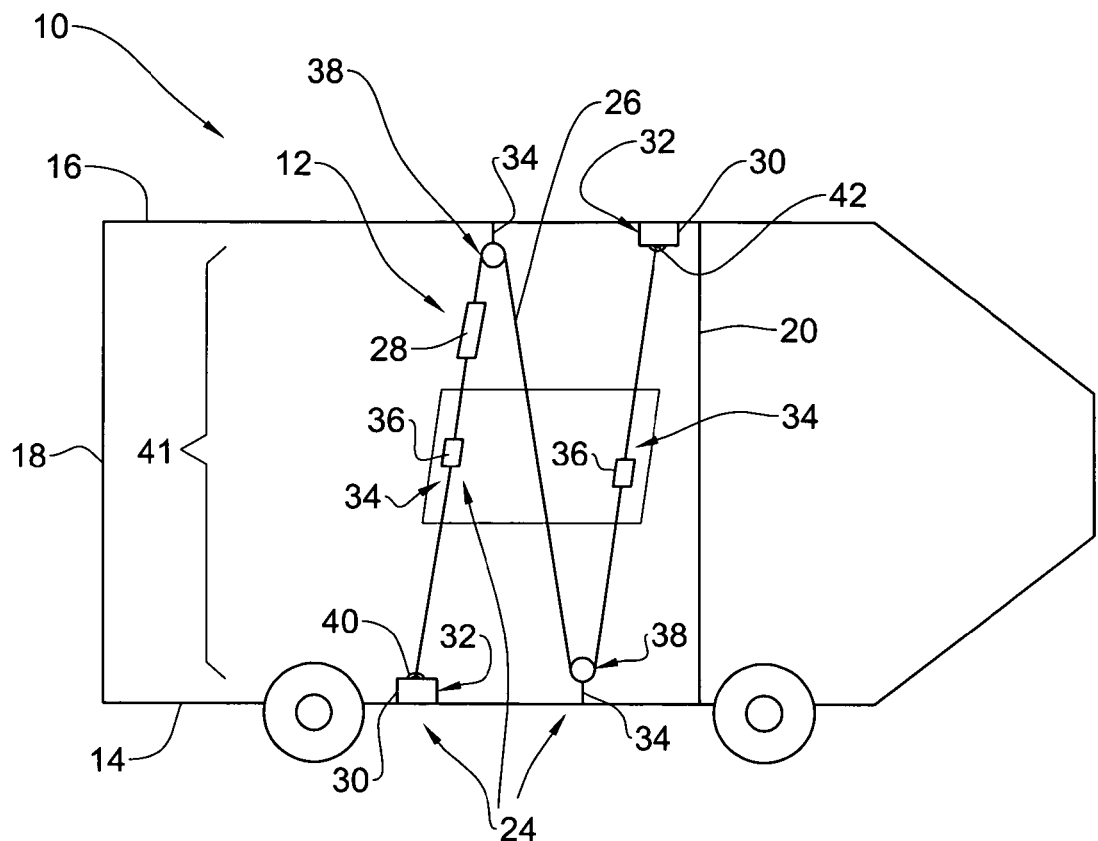
FIG. 1 is a schematic back view of a suspension apparatus holding an object in a suspended position inside a vehicle, according to one embodiment of the present invention.

Referring now to the drawings wherein like reference characters designate like or corresponding parts throughout several views, there is shown in FIG. 1 a vehicle 10, such as an armored personnel carrier, and one example of a suspension apparatus, generally designated by the numeral 12, mounted therein and holding an object 13 in a suspended position.

The vehicle 10 comprises fixed inner surfaces including a floor or lower surface 14, a ceiling or upper surface 16, a rear wall 18, a front wall 20 and two side walls (not seen).

The suspension apparatus 12 comprises an anchoring arrangement generally designated as 24, an elongated suspension element 26 which is held by the anchoring arrangement 24 in a predetermined spatial disposition with the possibility to be tensioned, and a tensioning mechanism 28 in the form of a ratchet mechanism mounted on the suspension element 26 for the tensioning and slackening thereof.

The anchoring arrangement 24 comprises a plurality of connection elements including static connection elements 30 in the form of metal brackets 32 fixed to the lower surface 14 and upper surface 16, and dynamic connection elements 34 in the form of cylindrical or annular flanges 36 having an inner diameter (not shown), fixed to the object 13, and pulleys 38 fixed to the lower surface 14 and upper surface 16 of the vehicle 10.

The suspension element 26 is in the form of a high strength fiber rope. One example of a rope that may be used as the suspension element 26 is the one sold under the model name "XY-5031" by Otto Pearl & Sons Ltd. in Israel. The rope has an external diameter (not shown) smaller than the inner diameter of the flanges 36, and comprising a first end portion 40, a second end portion 42 and a central portion 44 extending therebetween. The rope 26 is bendable, has a minimum tear strength of about 5000 kg, and has low elasticity for reasons which will be discussed hereinafter.

The suspension element 26 engages the anchoring arrangement 24 as follows. The suspension element's first end portion 40 is tied to the bracket 32 disposed on the lower surface 14 and second end portion 42 is tied to the bracket 32 disposed on the upper surface 16. Hence each end portion 40, 42 forms a static connection with the bracket 32 to which it is tied. The suspension element's central portion 42 dynamically engages each pulley 38 and the flanges 36, by being freely and slidingly received therein, thereby allowing the central portion 42 to be moved relative to these elements when the suspension element 26 is not under tension.

The flanges 36 each comprise a clamping mechanism (not shown) capable of being brought to an open state, to allow the suspension element 26 to freely move therein, and a closed state, to fix the suspension element 26 thereto. When the clamping mechanism of each flange 36 is brought to the closed state, a static connection between the object 13 and the suspension element 26 is formed.

To bring the object 13 to a suspended position the suspension element 26 is tensioned via the tensioning mechanism 28. During the tensioning, the central portion moves with respect to all of the dynamic connection elements 34, 36. After tensioning the predetermined spatial disposition of the suspension element 26, becomes essentially N-shaped, as shown. The object 13, however, is still able to move with respect to the suspension element 26 via the flanges 36, and is thus optionally slid towards the lower surface 14 or upper surface 16, into a position spaced from both. When the object 13 is positioned as shown in FIG. 1, the clamping mechanisms (not shown) on the flanges 36 are brought to a closed state, thereby fixing the object 13 in a suspended position such that it is spaced from and arrested from motion towards the lower and upper surfaces (14,16) of the vehicle 10.

Among advantages of the suspension element 26 engaging multiple connection points 36 on the upper surface 16 of the vehicle 10 is that a division of forces of the downward load caused by the weight of the object 13 may be obtained. The division of forces, which is a result of the single elongated element 26 engaging multiple connection elements, also allows the magnitude of force needed to tension the system to be reduced, as it is divided in accordance with the number of connection elements and the length of the elongated rope 26. Accordingly, increasing the number of connection elements in an anchoring arrangement for holding a suspension element is advantageous. Also, with the suspension element 26 engaging multiple connection points on the lower surface 14 of the vehicle 10, a division of forces of the upward directed load caused by the object 13 may be obtained due to the tensioning of the suspension element 26 via the tensioning mechanism 28. In addition, due to the use of only non-rigid elements to suspend the object 13, i.e. in this example the bendable rope 26, in a case where an inner surface of the vehicle 10 is impacted by a sudden force, such force may not be transferred from the inner surface impacted to the object 13 via the rope 26 suspending it. A further advantage of using the rope 26 which has low elasticity, is that in a case where an inner surface of the vehicle 10 is impacted by a sudden force, the object 13 may not rebound towards the impacted surface, which may occur with a suspension element having high elasticity. Additionally, use of the rope 26, which is made of a high strength fiber material, allows it to be tensioned to a high degree without stretching or breaking, which is advantageous for preventing undesired movement of the object 13 during normal motion of the vehicle 10.

Figure 2:
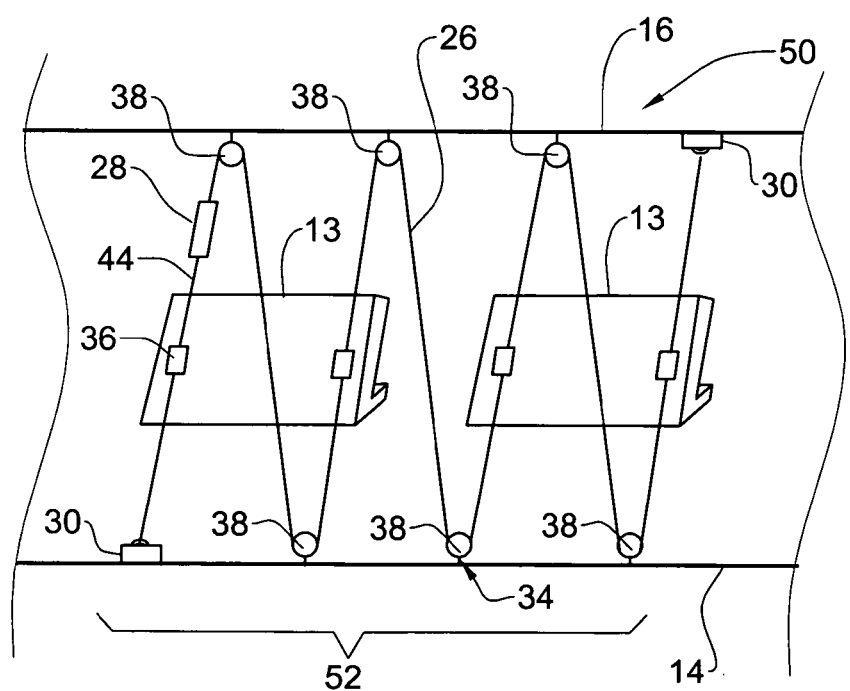
FIG. 2 is a schematic back view of a suspension apparatus holding two objects in a suspended position according to another embodiment of the present invention.

Turning to FIG. 2, another suspension apparatus 50 is shown comprising a single suspension element 26 having a different predetermined spatial disposition to that shown in FIG. 1, resulting from a different anchoring arrangement 52.

The anchoring arrangement 52 differs from that shown in FIG. 1, in that it has additional dynamic connection elements 34 in the form of pulleys 38 fixed to the lower surface 14 and the upper surface 16 of a vehicle (not fully shown) interposed between the static connection elements 30. This anchoring arrangement 52 allows suspending of a plurality of objects 13, each of which is suspended in the same manner as the object 13 described above in connection with FIG. 1.

To bring each of the plurality of objects 13 to a suspended position the suspension element 26 of the suspension apparatus 50 is tensioned via the tensioning element 28 and subsequently each object 13 is fixed to the suspension element, as described above in connection with the suspension apparatus 12.

Notably, the suspension apparatus 50 also benefits from the advantages listed above, and among its additional benefits is that it may be able to bring multiple objects to a suspended position with relative ease, while being spaced from the inner surfaces of a vehicle and the adjacent objects.

Turning attention now to FIGS. 3-7, other suspension apparatuses comprising at least one additional elongated suspension element are shown, each illustrated holding an object 13 having a lower portion 66 and an upper portion 68, in a suspended position inside a vehicle (not fully shown) comprising fixed inner surfaces including a floor or lower surface 14, a ceiling or upper surface 16, and a side wall 22 (shown in a part of FIGS. 3 to 7).

Figure 3:
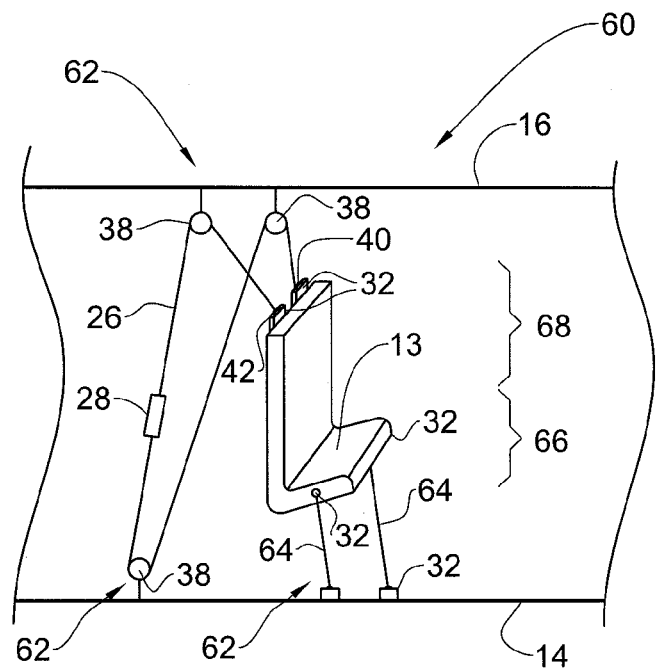
FIG. 3 is a schematic side view of a suspension apparatus inside a vehicle, comprising two additional elongated suspension elements according to yet another embodiment of the present invention.

In FIG. 3, a suspension apparatus, generally designated by the numeral 60, comprises an anchoring arrangement generally designated as 62, a suspension element 26 held in a first predetermined spatial disposition by the anchoring arrangement 62, and two additional elongated suspension elements 64 held by the anchoring arrangement 62 in a second predetermined spatial disposition. Each of the additional suspension elements 64 is similar to the suspension element 26 with the exception that the central portion of the additional suspension elements 64 has a predetermined length, which will be discussed in more detail hereinafter.

The anchoring arrangement 62 comprises static connection elements in the form of metal brackets 32 fixed to the lower surface 14, and to the lower and upper portions of the object (66,68), and dynamic connection elements in the form of pulleys 38 fixed to the lower surface 14 and the upper surface 16 of the vehicle.

The suspension element 26 is held by the anchoring arrangement 62 in the first predetermined spatial disposition as follows: the suspension element's first end portion 40 and second end portion 42 are tied to the two metal brackets 32 on the upper portion 68 of the object 13, and the suspension element's central portion 44 slidingly engages the three pulleys 38.

The additional suspension elements 64 are each held by the anchoring arrangement 62 in the second predetermined spatial disposition as follows: the additional suspension element 64 has one end thereof tied one of the metal brackets 32 on the lower surface 14 and the other one end thereof tied to one of the metal brackets 32 on the lower portion of the object 66.

The length of the elements 64 is predetermined to be sufficiently long to allow the lower portion 66 of the object 13 to be spaced from the lower surface 14 and the upper portion 68 of the object 13 to be spaced from the upper surface 16, when the additional elongated objects 64 are in the second predetermined spatial disposition and the object 13 is in the suspended position.

Figure 4:
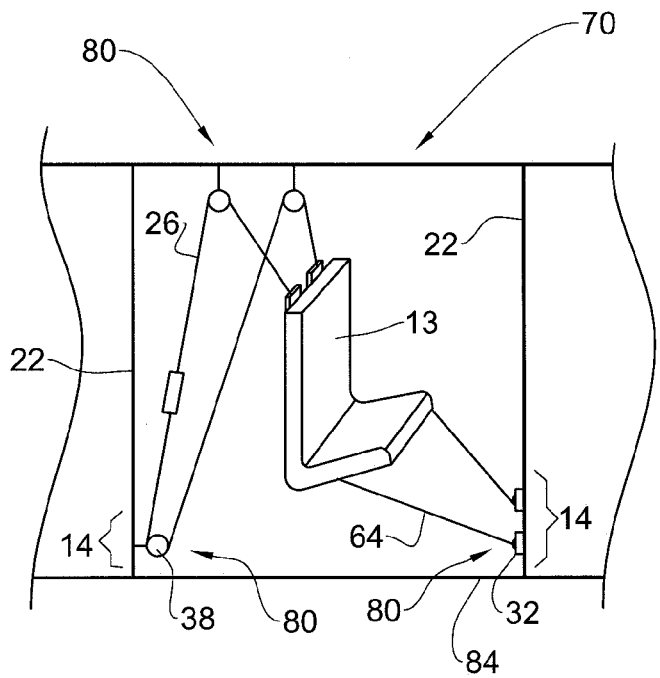
FIG. 4 is a schematic side view of the suspension apparatus shown in FIG. 3 with some of its connection elements fixed to alternative surfaces of a vehicle.

It should be noted that lower surface 14 and upper surface 16 of a vehicle need not necessarily be the floor and ceiling of a vehicle. For example, FIG. 4 illustrates a suspension apparatus generally designated as 70, wherein the anchoring arrangement 80 comprises connection elements (32,38) fixed to a portion of a side wall 22 adjacent to the floor 84 of a vehicle which constitutes the lower surface 14. Notably in FIG. 4, the object 13 is held in a suspended position, similar to that shown in FIG. 3, with the same advantages.

Figure 5:
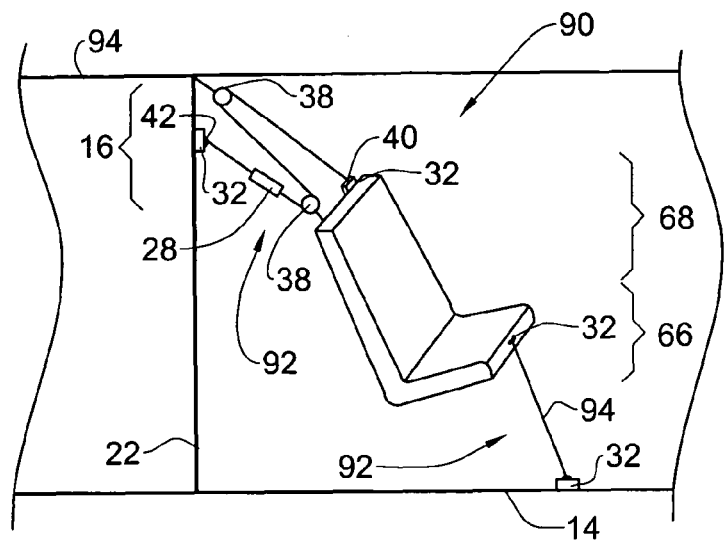
FIG. 5 is a schematic side view of a suspension apparatus comprising a single additional elongated suspension element according to a further embodiment of the present invention.

A further suspension apparatus is illustrated in FIG. 5 generally designated as 90, comprising an anchoring arrangement generally designated as 92, an elongated suspension element 26 held by the anchoring arrangement 92 in a first predetermined spatial disposition, a tensioning element 28 mounted on the suspension element 26, and a single additional elongated suspension element 94 held by the anchoring arrangement 92 in a second predetermined spatial disposition. The additional suspension element 94 is similar to the suspension elements 64 described above with reference to FIG. 3.

The anchoring arrangement 92 comprises static connection elements in the form of metal brackets 32 fixed to the lower surface 14 of a vehicle, the lower and upper portions 66 and 68 of the object 13, and a portion of a side wall 22 adjacent to a portion of the ceiling 94 of the vehicle or upper surface 16, and dynamic connection elements in the form of pulleys 38 fixed to the upper portion 68 of the object 13 and the upper surface 16.

The suspension element 26 is held by the anchoring arrangement 92 in the first predetermined spatial disposition as follows: the suspension element's first end portion 40 is tied to the metal bracket 32 on the upper portion 68 of the object 13, the second end portion 42 is tied to upper surface 16 of the vehicle, and the suspension element's central portion 44 engages the two pulleys 38.

The additional suspension element 92 is held by the anchoring arrangement 92 in the second predetermined spatial disposition as follows: the additional suspension element's first end is tied to the metal bracket 32 on the lower surface 14 and it's other one end is tied to the metal bracket 32 on the lower portion of the object 66.

To prevent undesired vibrations and shaking of an object suspended inside a vehicle, non-load bearing stabilizing elements can be added to the suspension apparatus, for example, which are connected between the object and the fixed inner surfaces of the vehicle.

Figure 6:
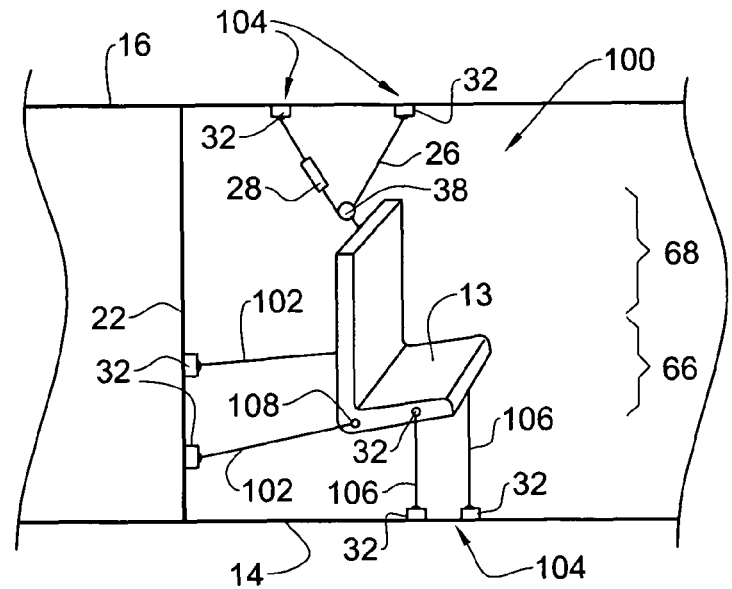
FIG. 6 is a schematic side view of a suspension apparatus comprising stabilizing straps according to yet a further embodiment of the present invention.

FIG. 6 illustrates yet another suspension apparatus generally designated as 100, comprising an anchoring arrangement 104, a suspension element 26 held by the anchoring arrangement 104 in a first predetermined spatial disposition, a tensioning element 28 mounted on the suspension element 26, two additional elongated suspension elements 106 in the form of two ropes which are held by the anchoring arrangement 104 in a second predetermined spatial disposition, and two stabilizing elements in the form of straps 102 held by the anchoring arrangement 104 in a third predetermined spatial disposition.

The anchoring arrangement 104 comprises a plurality of connection elements including static connection elements in the form of brackets 32 fixed to the lower, side and upper surfaces of a vehicle 14, 22, and 16 and the lower portion 66 of the object 13, and a dynamic connection element in the form of a pulley 38 fixed to the upper portion 68 of the object 13.

The suspension element 26 is held by the anchoring arrangement 104 in the first predetermined spatial disposition as follows: the suspension element's first and second end portions 40, 42 are tied to the brackets 32 on the upper surface 16 of the vehicle, and the central portion 44 thereof is engaged to the pulley 38 in a dynamic manner.

The stabilizing straps 102 each have two ends and a central portion extending therebetween which has a predetermined length, determined in a manner similar to that described above with respect to the additional suspension elements 64 in FIG. 3.

The additional suspension elements 106 are of similar form to the additional suspension elements 64 and 94 described above and are held by the anchoring arrangement 104 in the second predetermined spatial disposition as follows: the additional suspension elements 106 are each tied at one end thereof to one of the brackets 32 on the lower surface 14 and the other end to one of the brackets 32 on the lower portion 66 of the object 13.

The stabilizing straps 102 are elongated straps with two ends. The straps 102 are held by the anchoring arrangement 104 in the third predetermined spatial disposition as follows. The straps 102 are each tied at one end thereof to one of the brackets 32 on the side wall 22 and the other one end to one of the brackets 32 on the lower portion 66 of the object 13. Notably, the stabilizing straps 102 do not need to be designed to bear the weight of the object 13 and therefore may be made of material which is not as high strength as that used for the suspension elements 24 and 106.

Figure 6A:
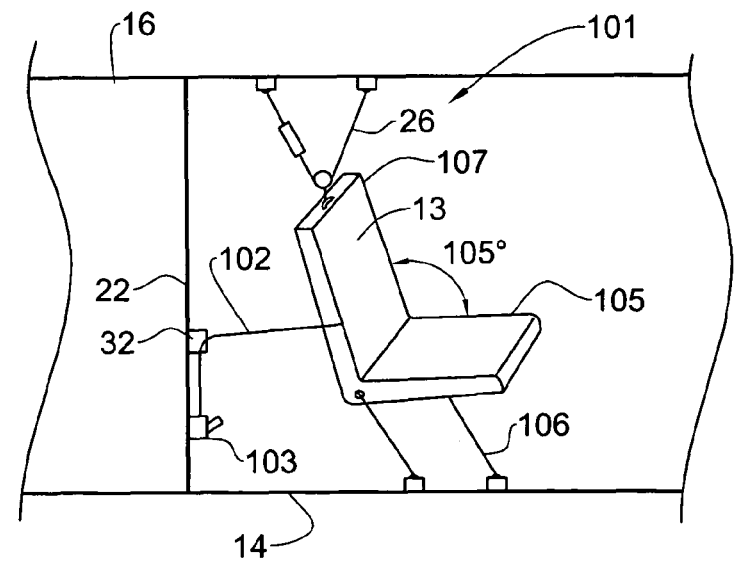
FIG. 6A is a schematic side view of a suspension apparatus comprising stabilizing straps fitted with a tensioning mechanism according to yet another embodiment of the present invention.

FIG. 6A illustrates yet another suspension apparatus generally designated as 101, which is similar to the suspension apparatus 100 shown in FIG. 6, with the exception being that it comprises a single stabilizing strap 102 fitted with a tensioning mechanism 103 attached to the side wall 22.

The tensioning mechanism 103 shown is a ratchet mechanism which, when operated, serves to tension the stabilizing strap, thereby bringing the object 13 closer to the side wall 22 and also adjusting the object's orientation to a desired inclination.

It should be noted that in cases where the object 13 is a seat comprising a base portion 105 and a back portion 107, it may be desirable for the seat to be inclined slightly and for the base portion 105 and the back portion 107 to have an angle of at least 105 degrees therebetween, as shown in the present example. The object may also be inclined in other manners, for example by positioning the connection elements on the lower and upper surfaces of a vehicle such that they are not vertically aligned.

Figure 7:
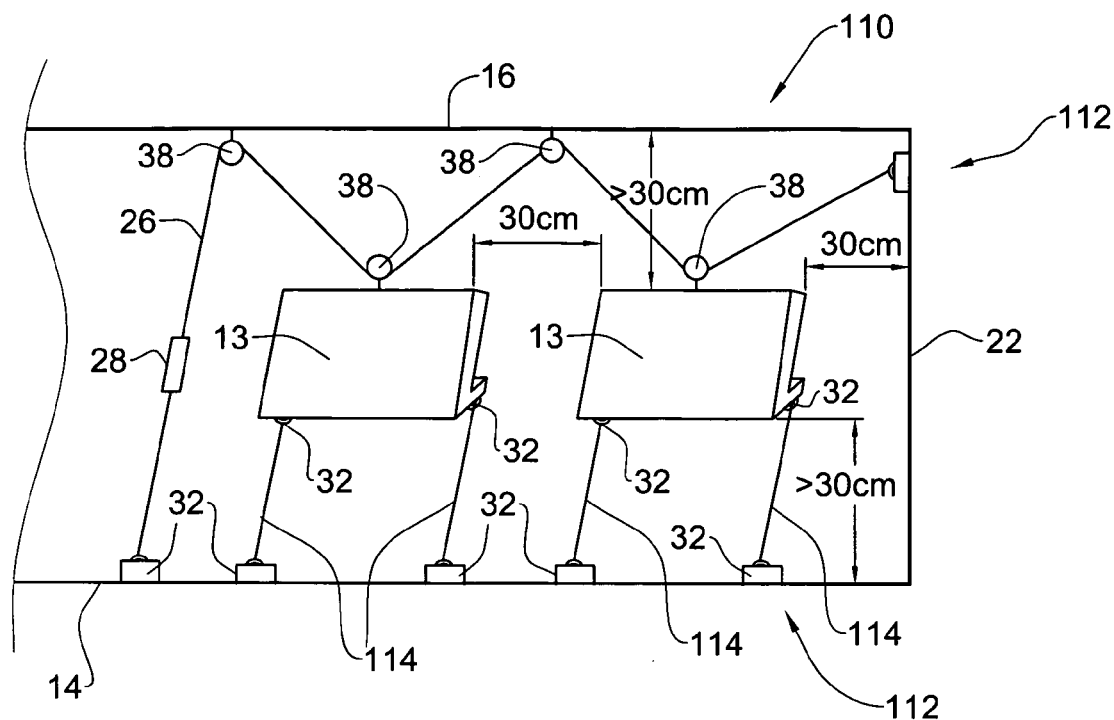
FIG. 7 is a schematic side view of a suspension apparatus holding two objects in a suspended position according to another embodiment of the present invention.

It should be noted that all of the suspension apparatuses described with reference to FIGS. 3-6A may also be adapted to suspend in a vehicle (not fully shown) a plurality of spaced objects with a common suspension element 26. In FIG. 7 such suspension apparatus is illustrated, generally designated as 110, comprising an anchoring arrangement 112, a suspension element 26 held by the anchoring arrangement 112 in a first predetermined spatial disposition, a tensioning element 28 mounted on the suspension element 26, additional elongated suspension elements 114 in the form of four ropes with predetermined lengths and held by the anchoring arrangement 112 in an additional predetermined spatial disposition. It should also be noted that each object 13 in FIG. 7 may be spaced from the inner surfaces of the vehicle and other objects by a minimum predetermined distance. Such predetermined distance may vary in accordance with factors such as the internal space within the vehicle and the structure of the vehicle, etc. This predetermined distance is designed to minimize the chance of collisions of adjacent objects when forces impact the vehicle.

To bring any of the objects 13 in FIGS. 3-7 to a suspended position, the suspension element 26 is tensioned via the tensioning mechanism 28, and each object, 13 is propelled towards the upper surface 16. The movement of the object 13 places the additional suspension elements 64, 94, 106, and 114 and stabilizing straps 102, if any, under longitudinal tension when they are fully extended to their predetermined lengths, thereby arresting the motion of each object 13 towards the upper surface 16 and maintaining it in a suspended position spaced from both the upper surface 16 and the lower surface 14 of the vehicle and other suspended objects, if any.

Figure 8:
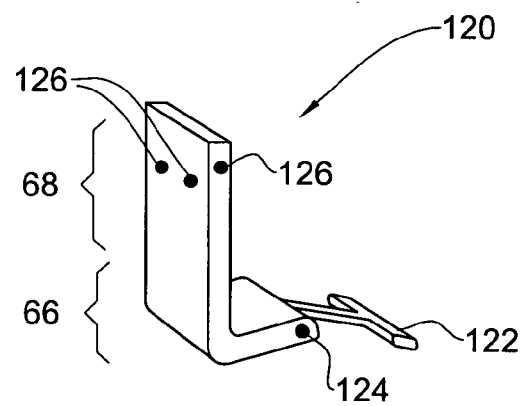
FIG. 8 is a schematic back view of a seat adapted to be suspended by a suspension apparatus in accordance with an embodiment of the present invention.
Figure 9:
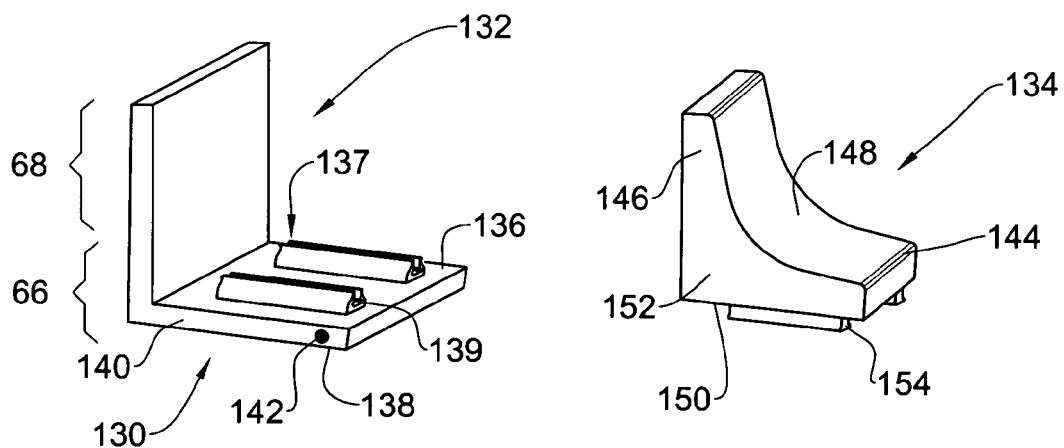
FIG. 9 is an exploded view of a seat assembly adapted to be suspended by a suspension apparatus in accordance with an embodiment of the present invention.

In cases where the objects 13 suspended by a suspension apparatus of the present invention are in the form of seats, examples of such seats are illustrated in FIGS. 8 and 9.

In FIG. 8 a seat, generally designated 120, is shown, whose lower portion 66 is in the form of a rigid base and upper portion 68 is in the form of a rigid back extending in a perpendicular direction from the lower portion 66. The lower portion 66 comprises a rigid foot rest 122 extending from an edge distal from the upper portion 68 and has a plurality of apertures 124 formed therein via which connection elements of a suspension apparatus (not shown) may be fixed thereto. The upper portion 68 has a plurality of apertures 126 formed therein for fixing connection elements and a seat belt thereto. The connection elements of the apparatus may be coupled to the apertures of the seat 120 by any suitable method, for example, by screwable connection or welding, etc.

During suspension of the seat 120 within a vehicle, the seat would have to be sufficiently spaced from the vehicle's lower and upper surfaces such that a person seated thereon would also be spaced from those surfaces.

An advantage of using a seat having a rigid base and/or rigid back include the lowered likelihood of a person using the seat, such as a soldier wearing equipment, having such equipment becoming entangled with the seat. Additionally, the foot rest may aid a user to space their legs from the lower surface of a vehicle. A further advantage of the seat 120 being suspended by the suspension apparatus is that it may be coupled detachably to the suspension elements and therefore it may be installed and removed with relative ease.

In FIG. 9 a seat assembly, generally designated 130, is shown, comprising a seat-supporting frame 132 and a seat 134 adapted to be mounted thereon.

The seat-supporting frame 132 comprises a lower portion 66 in the form of a base and an upper portion 68 in the form of a back extending in a perpendicular direction from the lower portion 66. The lower portion 66 is of a rectilinear shape and comprises an upper surface 136, a lower surface 138 and side surfaces 140 extending therebetween. The upper surface 136 comprises two rails 137 having a longitudinal inverted T-shaped groove 139 formed therein. The side surfaces have apertures 142 formed therein for connection with connection elements of a suspension apparatus (not shown). The upper portion 68 has a plurality of apertures (not shown) formed therein for fixing connection elements and a seat belt thereto.

The seat 134 comprises a seat portion 144 and a back portion 144 which roughly correspond in size to the seat-supporting frame's 132 lower portion 66 and upper portion 68, respectively. The seat portion 144 is of an essentially rectilinear shape and comprises an upper surface 148, a lower surface 150 and side surfaces 154 extending therebetween. The lower surface 136 comprises two rails 154 having a longitudinal T-shaped cross section of a size corresponding to the groove 139 formed on the rails of the seat-supporting frame 132, such that a slidable engagement may be made between the rails 137 and 139.

It can be understood that if the seat assembly 130 is suspended to a suspension apparatus (not shown) via flanges connecting the suspension element and the seat-supporting frame 132, and the seat is mounted on the seat-supporting frame 132 via the rails 137 and 139, such arrangement would provide a suspended seat which can be adjusted towards the upper or lower surfaces of a vehicle via the flanges or transverse thereto via the rails.

Figure 10:
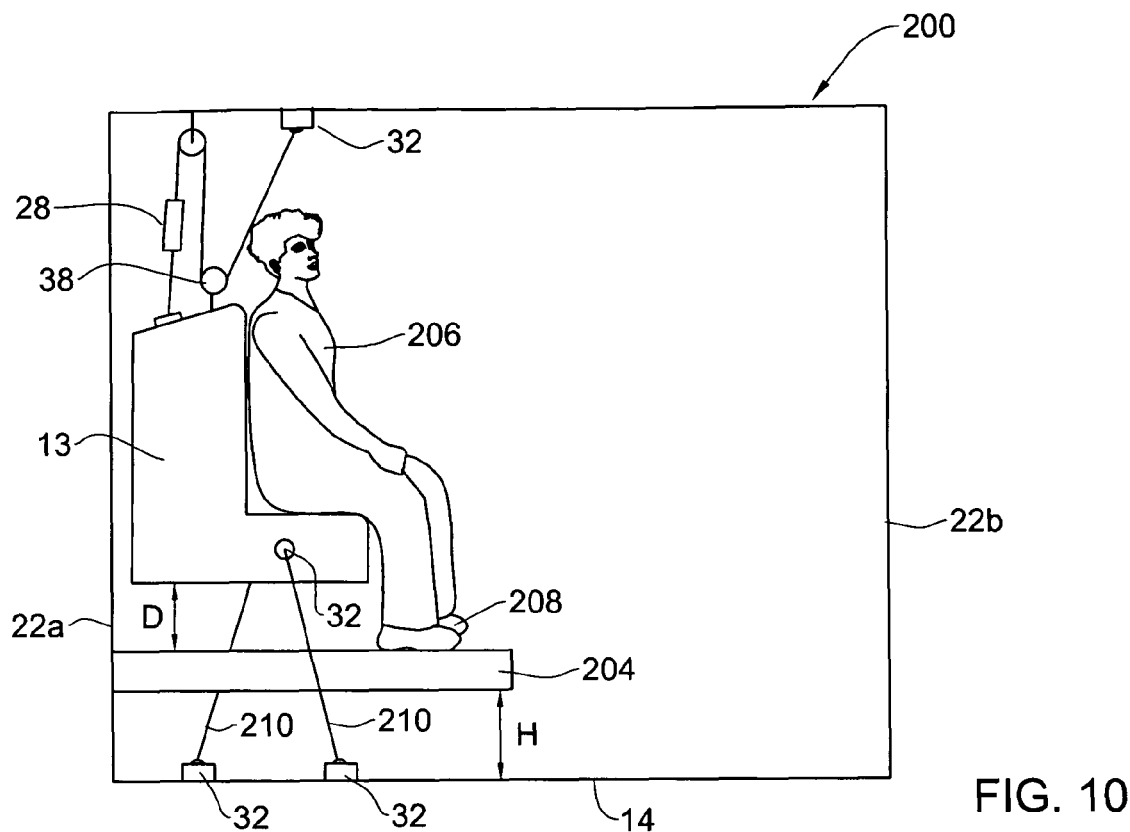
FIG. 10 is a schematic internal rear view of a vehicle comprising a suspension apparatus and an example of a platform held by the vehicle according to a further embodiment of the present invention.

In FIG. 10 a part of a vehicle 200 is illustrated comprising a suspension apparatus 202 and platform 204 held elevated in a bridge-like manner in the vehicle 200. The vehicle is shown with its upper surface 12, lower surface 14 and side walls 22a and 22b. Also illustrated is a person 206 seated on a suspended seat 13 of the suspension apparatus 202, resting his feet 208 on the platform 204.

The suspension apparatus 202 is connected to the upper surface 12 of the vehicle in any of the manners described above, and is connected via suspension elements 210, to the lower surface 14 of the vehicle. Notably, the seat is spaced a predetermined height D from the platform 204. The predetermined height D may be chosen in accordance with factors such as the internal space within the vehicle, the orientation of the seat 13, the estimated average height of a user, etc.

The platform 204 can be seen to be held in a position, spaced a predetermined height H from the lower surface 14 of the vehicle by attachment thereof to the sidewall 22a of the vehicle 200. The predetermined height H may vary in accordance with factors such as the internal space within the vehicle and the structure of the vehicle, etc.

Figure 11:
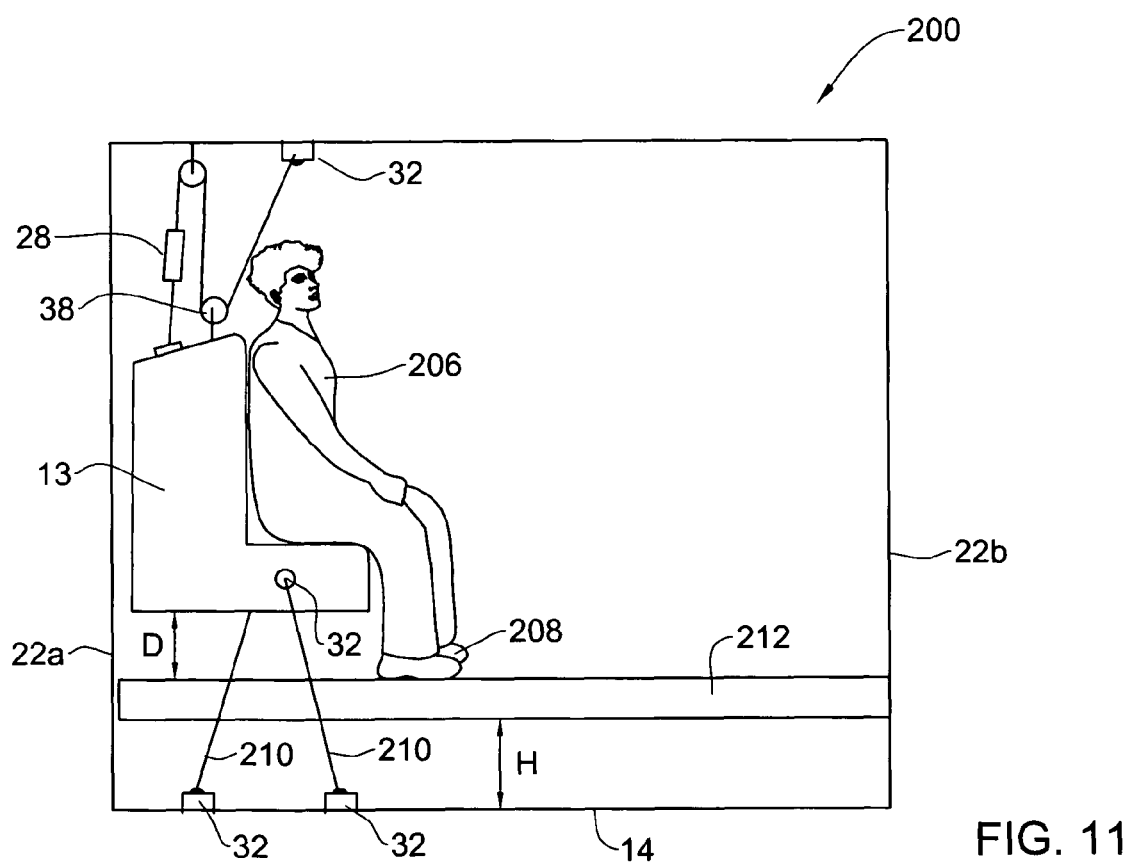
FIG. 11 is a schematic internal rear view of a vehicle comprising a suspension apparatus and a platform held by the vehicle according to a still further embodiment of the present invention.
Figure 12:
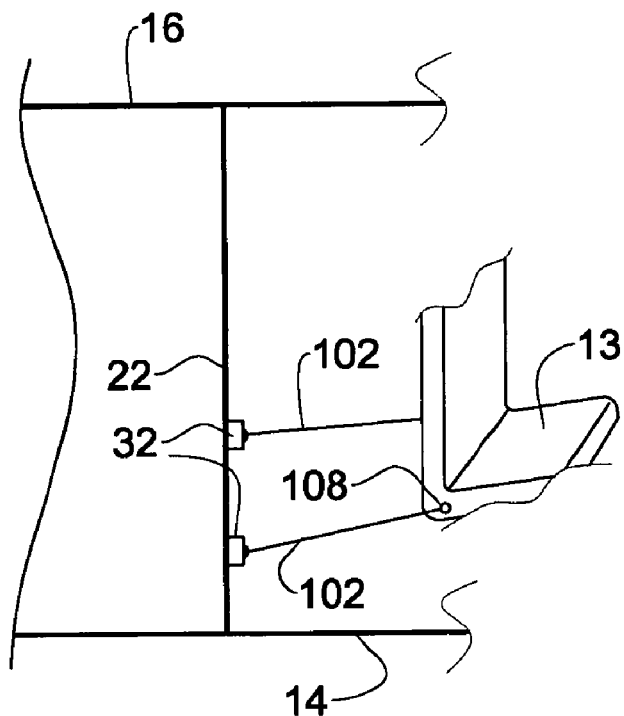
FIG. 12 is a schematic side view of an object connected to a surface of a vehicle via stabilizing elements.
Figure 13:
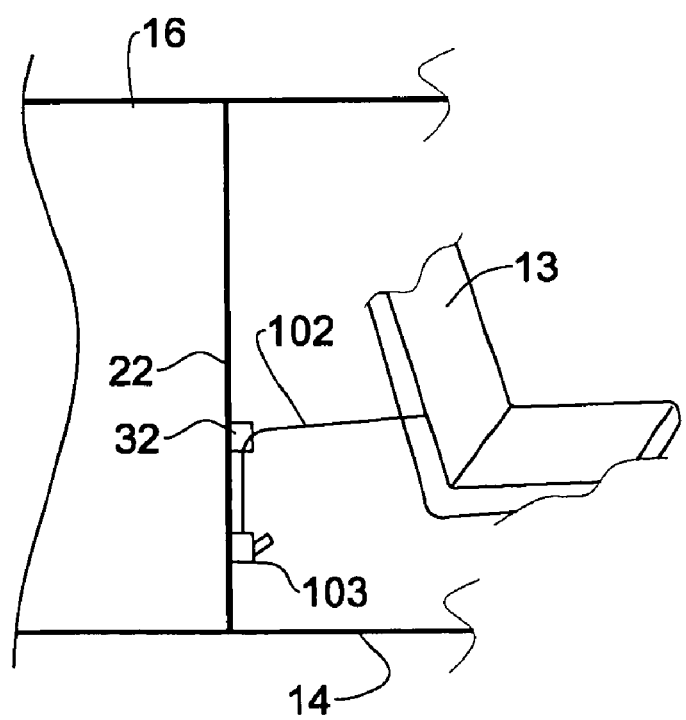
FIG. 13 is a schematic side view of an object connected to a surface of a vehicle via a stabilizing element.

In FIG. 11 an alternative platform 212 is illustrated attached to and extending in a bridge-like manner between side walls 22a and 22b, forming a bridge-like structure therebetween. This arrangement is advantageous if a user wishes the platform 212 to function also as a floor.

Those skilled in the art to which this invention pertains will readily appreciate that numerous changes, variations and modifications can be made without departing from the scope of the invention mutatis mutandis. For example, the dynamic connection elements may be of any suitable structure allowing movable connection therewith, for example U-shaped brackets may be used, wherein the elongated elements are slidably engaged therewith but not tied statically thereto. Additionally the static connection elements may be of any suitable structure, for example, they may be in the form of apertures integrally formed within the inner surfaces of the vehicle or the object to which the elongated elements may be tied. The tensioning apparatus may be mounted on a suspension element extending between an object and the lower surface. The suspension elements may be of various high strength materials, for example they may be of the type used for mountain climbing or hoisting equipment or heavy loads, and may have a cross section which is not circular, for example the suspension element could also be a high strength cable or a high strength cord or a high strength strap or belt, etc.

The invention claimed is:

1. A method for holding at least one object in a suspended position in a vehicle having fixed inner surfaces including a lower surface and an upper surface, including the steps of:
   (a) providing a suspension apparatus including an elongated suspension element comprising two end portions and a central portion extending therebetween, a single tensioning mechanism mounted on the elongated suspension element, and an anchoring arrangement comprising a plurality of connection elements including static and dynamic connection elements;
   (b) fixing the connection elements to two connection points on the vehicle's upper surface and at least one point on the object and the lower surface of the vehicle;
   (c) engaging at least some of the static and dynamic connection elements with the elongated suspension element thereby holding the elongated suspension element in a predetermined spatial disposition with the possibility to be tensioned by the tensioning mechanism; the engaging of the elongated suspension element with the connection elements being in the form of static connection with each of the end portions via the static connection elements, and dynamic connection of the central portion with dynamic connection elements, the static and dynamic connection elements engaging the elongated suspension element being disposed on the object and at least two spaced apart points on the upper surface of the vehicle, whereby the central portion of the elongated suspension element is allowed to move relative to the static and dynamic connection elements when the elongated suspension element is not under tension; and
   (d) tensioning the elongated suspension element via the tensioning mechanism such that the object is thereby spaced from, and arrested from motion towards, the lower and upper surfaces of the vehicle in the suspended position.

2. The method of claim 1, wherein step (a) further includes providing an additional elongated suspension element having two end portions and a central portion extending therebetween, and step (c) further includes engaging the two end portions of the additional suspension element to at least one of the connection elements on the lower surface and at least one of the connection elements on the object.

3. The method of claim 1, wherein the tensioning of the elongated suspension element in step (d) results in propelling the object towards the upper surface of the vehicle.

4. The method of claim 1, wherein the engaging in the form of static connection of the end portions of the elongated suspension element in step (c), is with two static connection elements fixed to the inner surfaces of the vehicle.

5. The method of claim 1, wherein the engaging in the form of static connection of the end portions of the elongated suspension element in step (c), is with two static connection elements fixed to the object.

6. The method of claim 1, wherein the engaging in the form of static connection of the end portions of the elongated suspension element in step (c), is with one static connection on the object and with one static connection on one of the inner surfaces of the vehicle.

7. The method of claim 1, wherein the engaging of the central portion of the elongated suspension element in step (c), is with two or more dynamic connection elements.

8. The method of claim 1, wherein the fixing of the connection elements in step (b) includes fixing connection elements to two spaced points on the lower surface of the vehicle and the object, the anchoring arrangement holding the elongated suspension element via the connection elements fixed to the two spaced points on the lower surface in a predetermined spatial disposition thereby spacing the object from, and arresting its motion towards, the upper surface of the vehicle when the object is in the suspended position.

9. The method of claim 1, wherein step (a) further includes providing at least one additional elongated suspension element having a first end portion, a second end portion and a central portion extending therebetween; the fixing of the connection elements in step (b) includes connection elements being fixed to two spaced points on the lower surface of the vehicle; the engaging in step (c) includes engaging the at least one additional suspension element via the connection elements fixed to the two spaced points on the lower surface and at least one connection element on the object in an additional predetermined spatial disposition, thereby spacing the object from, and arresting its motion towards, the upper surface of the vehicle when the object is in the suspended position.

10. The method of claim 1, wherein the engaging of the end portions of the at least one additional elongated suspension element is in the form of static connection.

11. The method of claim 1, wherein the elongated suspension element is selected from the group consisting of a high strength fiber rope, a high strength cable, a high strength cord, and a high strength strap.

12. The method of claim 1, wherein the suspension apparatus is further provided with at least one stabilizing element for arresting the object from rotational motion and/or shaking.

13. The method of claim 12, wherein the at least one stabilizing element is a non-load bearing stabilizing element.

14. The method of claim 12, wherein the at least one stabilizing element connects the object and one of the surfaces of the vehicle.

15. The method of claim 1, wherein the suspension apparatus is adapted for holding two or more objects.

16. The method of claim 1, wherein the suspended position for the object is spaced from all inner surfaces of the vehicle and all other objects in the vehicle by a minimum predetermined distance.

17. The method of claim 1, wherein the object is a seat.

18. The method of claim 17, wherein the seat further comprises a foot rest for spacing a person sitting thereon from the lower surface of the vehicle.

19. The method of claim 17, wherein the seat is a rigid seat comprising a rigid base and back extending therefrom.

20. The method of claim 17, wherein the seat is adapted to be detachably attached to the elongated suspension element.

21. The method of claim 1, wherein the object is a seat assembly including a seat-supporting frame adapted for mounting on the elongated suspension element via the connection elements of the anchoring arrangement and slidable engagement therewith, and a seat adapted to be mounted on the seat-supporting frame.

22. The method of claim 21, wherein the connection elements used to mount the seat-supporting frame on the elongated suspension element further comprise a clamping mechanism for clamping the elongated suspension element and thereby changing the slidable engagement to a static engagement.

23. The method of claim 21, wherein the seat and the seat-supporting frame further comprise a corresponding rail arrangement which allows slidable engagement thereof.

24. The method of claim 1, wherein the vehicle further comprises additional objects and the suspension apparatus is adapted for holding the additional objects in a suspended position in the vehicle.

* * * * *